C. W. BOUR.
TRAP NEST.
APPLICATION FILED APR. 5, 1919.
1,336,191.
Patented Apr. 6, 1920.
3 SHEETS—SHEET 1.
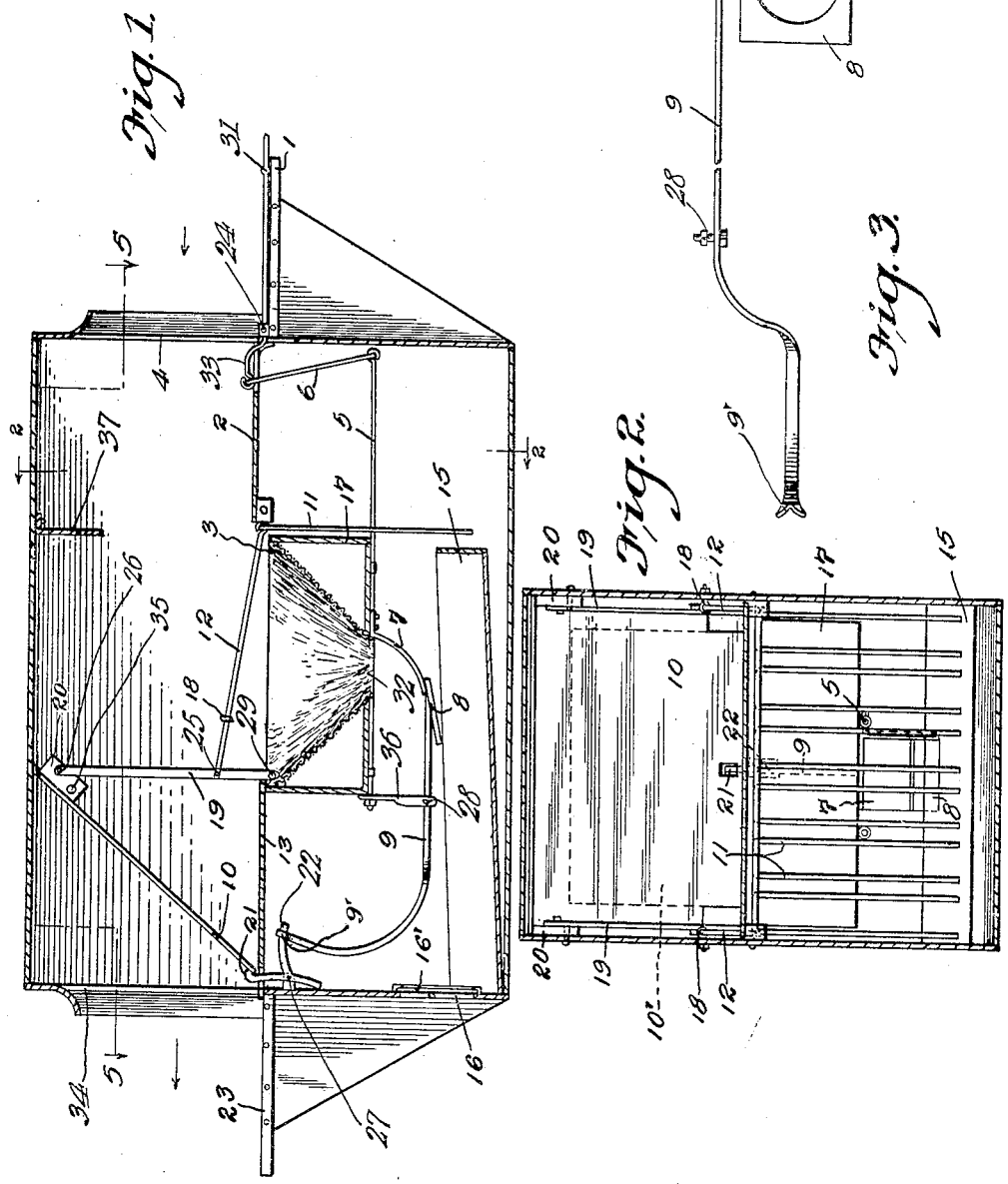
Inventor
CHARLES W. BOUR,
By Lester L. Sargent
Attorney C. W. BOUR.
TRAP NEST.
APPLICATION FILED APR. 5, 1919.
1,336,191.
Patented Apr. 6, 1920.
3 SHEETS—SHEET 2.
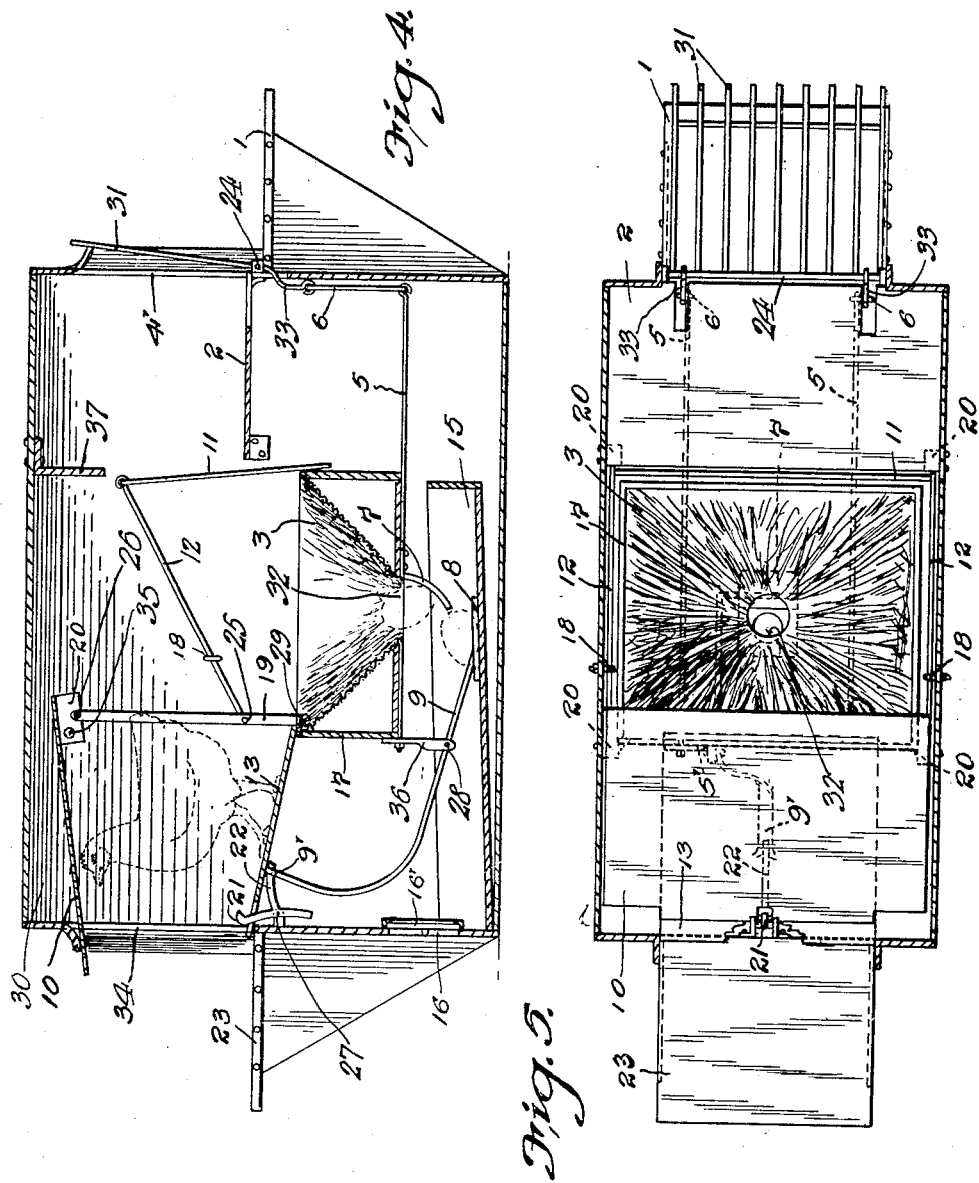
Inventor
CHARLES W. BOUR,
By
Lester L. Sargent
Attorney

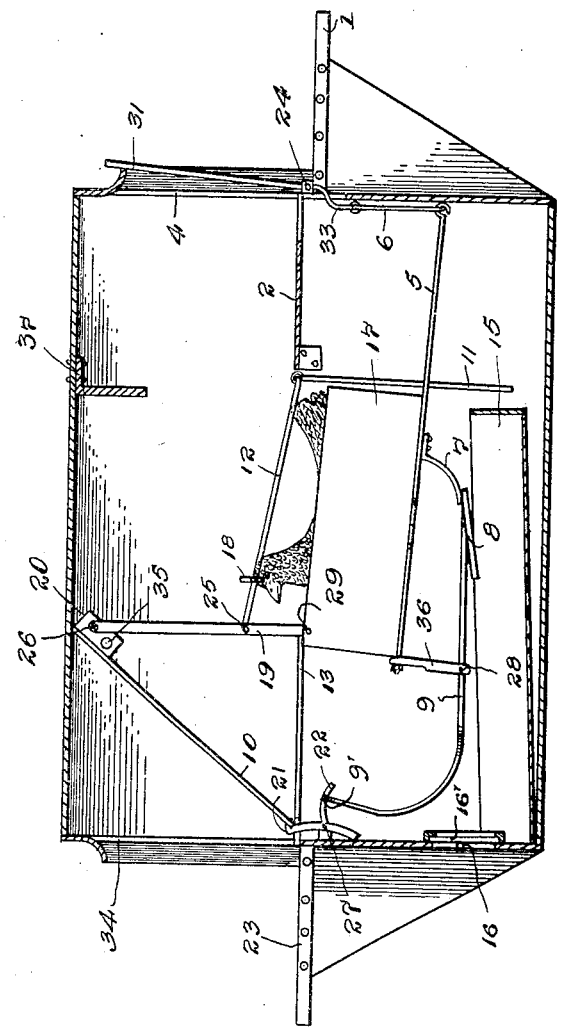

UNITED STATES PATENT OFFICE.

CHARLES W. BOUR, OF SOUTH BEND, INDIANA.

TRAP-NEST.

1,336,191. Specification of Letters Patent. Patented Apr. 6, 1920.

Application filed April 5, 1919. Serial No. 287,709.

*To all whom it may concern:*

Be it known that I, CHARLES W. BOUR, a citizen of the United States, residing at South Bend, in the county of St. Joseph and State of Indiana, have invented a new and useful Trap-Nest, of which the following is a specification.

The object of my invention is to provide an improved trap nest of the automatically operative type, said nest being provided also with means for trapping the eggs in a separate compartment beneath the nest after they have been laid. It is also my object to provide a more efficient arrangement of parts for the automatic operation of a trap nest. I attain these and other objects of my invention by the mechanism illustrated in the accompanying drawings.

Figure 1 is a vertical longitudinal section of the nest in position for the hen to enter;

Fig. 2 is a vertical transverse section of line 2—2 of Fig. 1;

Fig. 3 is a detail view of member 8, 9, and 9′;

Fig. 4 is a vertical longitudinal section, showing the disposition of the doors on the nest as the hen leaves same;

Fig. 5 is a section of the nest, on line 5—5 of Fig. 1; and

Fig. 6 is a longitudinal vertical section, showing the disposition of the parts of the device while the hen is on the nest but with no egg laid.

Similar characters of reference designate similar parts throughout the several views.

Referring to the accompanying drawings, I provide a trap nest box or outer casing 30 having a bracket or stationary platform 1 leading to the entrance opening 4. I provide a suitable nest 3 and an entrance platform 2 leading from the stationary platform 1 to the nest 3. Nest 3 is mounted in a nest box 17 which is provided with a central egg opening 32. Attached to the lower portion of the nest box 17 is a rod 5, having a hooked end engaging a link 6, which in turn is hooked to the hook end of extensions 33 of the slatted door 31 which is swingingly mounted on the rod 24, as shown in Figs. 1 and 5. Platform 2 is a stationary platform secured to the casing 30 in any suitable manner.

Referring to Fig. 4 I provide a suitable slatted or wire door 11 operatively attached to the hooked ends of rods 12, which members are pivotally and slidably supported by suitable staples or screw eyes 18, as illustrated in Figs. 1, 2 and 4. The other ends of rods 12 are connected by pivots 25 to straps or bars 19, which are connected by pivots 26 to flanges 20 of a solid door 10, which is adapted to close the exit opening 34, to which platform 13 leads from nest 3, as shown in Fig. 4.

Attached to the bottom of nest box 17 adjacent egg opening 32. I provide a suitable egg chute or shield 7, by which the egg is guided to the trip or paddle member 8, which preferably is shaped as shown in Fig. 3 with an opening of suitable size to prevent the egg from rolling off of member 8. Member 8 is attached to a lever 9 which is pivotally supported by pivot 28 from arm 36 which is affixed to nest box 17 in any suitable manner. As shown in Fig. 3 lever 9 is provided with a suitable forked end or catch 9′ which is releasably engaged by trip arm 22 which is connected to bottom end of door 10, by means of the latch 21, of which it is an integral part as shown in Fig. 1. Latch 21 is swingingly supported by a suitable pivot 27 mounted to the exit end of the nest box casing as shown in Fig. 1. I provide a suitable stationary exit platform 23 in approximate alinement with platform 13. The slatted doors 31 and 11 are preferably formed of wire bent to the desired shape. The eggs are collected in an egg tray 15 into which they roll from paddle 8. I provide a suitable door 16′ in the bottom portion of the nest box, adapted to close the opening 16, which is of sufficient size to readily and conveniently permit of the removal of the eggs from the tray 15, where they are inaccesible to the poultry. This arrangement effectively prevents the possibility of hens acquiring the egg eating habit, and also eliminates the possibility of the egg being accidentally broken by hens crowding in an effort to get into a desired nest. I provide a short depending partition 37 in substantial alinement with slatted door 11 when the latter has been swung into position to close the passage to the nest after the fowl has entered nest 3.

Referring to Fig. 1, the nest is in position for the hen to enter, with slatted door 31 open; with exit 10 in closed position; and with paddle 8 in elevated position to receive the egg, the hooked end of the paddle being engaged to arm 22 of latch 21, which latch is operatively engaged to the exit door 10. The inner slatted door is in its lower-most position so as not to interfere with the entrance of the hen to nest 3. Rear or exit door 10 being solid darkens the nest and thus makes it more inviting to a laying hen. The hen enters on platform 1 and platform 2 to nest 3. The weight of the hen on nest 3 depresses it thus depressing rods 5, links 6, extensions 33 and thus raising and closing the slatted entrance door 31, which will prevent any other entering the nest, while it is occupied. Bars 19 being pivotally attached to the corners of nest 3 by pivots 29 are lowered with that portion of the nest when the rear or exit door 10 is released and permitted to swing open, as shown in Fig. 4. This latter operation occurs when the hen lays an egg. The egg is guided by shield 7 to paddle 8 where the weight of the egg lowers member 8, thus tilting lever 9 and its forked end 9'. Thereupon catch 21 is released from engagement with the lower end of door 10 and the latter swings open so as to permit the hen to leave the nest by way of platforms 13 and 22 as shown in Fig. 4. In this position the weight of the hen on platform 13 holds the rear door 10, as well as inner slatted door 11 in the position shown in Fig. 4, as the end of platform 13 rests on the edge of nest box 17. When the hen steps from platform 13 to platform 23 the door 10 automatically swings to closed position once more and bars 19 attached to flanges 20 carried by the inner end of door 10 move rods 12 slidably and pivotally on members 18, thus lowering inner slatted door 11 automatically to its lowermost and original position, as shown in Fig. 1, and lowering door 31, ready for the next hen to enter the nest. The inner slatted door 11 on being moved to raised position after the hen has laid an egg operates to prevent the hen from leaving the nest by the entrance door. This feature of the nest is of importance where poultrymen are using the nest to determine what hens are laying.

What I claim is:

1. In a trap nest, the combination of an outer casing, a nest box suspended within the casing and substantially distant from both the entrance and exit openings of the nest, platforms leading to said nest box to prevent too quick an operation of the trap mechanism, a door normally resting in open position, means for swinging said door to and retaining it in closed position by the weight of the hen on the nest, a solid exit door, latch means for normally holding said door in closed position, egg operating means for releasing said latch means from the exit door when an egg is laid, and a door interior of the nest and spaced apart from the entrance door a substantial distance operatively connected to the exit door and arranged to be swung to closed position by the opening of the exit door and to be automatically swung to open position by the closing of said exit door.

2. In a trap nest having opposite exit and entrance openings and platforms leading to said openings, the combination of a nest box suspended midway approximately between said openings, platforms leading to the nest box and spacing same substantially distant from both the entrance and exit openings to prevent any escape of the hen before proper operation of the device, one of said platforms having its weight at one end resting on the nest box, the nest box having a bottom opening for the exit of the egg, an egg tray beneath the nest box, a door positioned to afford access to the egg tray, while protecting same from predatory animals, an exit door operatively connected to the nest box and arranged to be automatically swung to open position when an egg is laid and the hen is ready to leave the nest, and means for preventing the exit of the hen through the entrance passage when an egg has been laid.

CHARLES W. BOUR.